United States Patent
Kirchhoff et al.

(10) Patent No.: US 10,238,021 B2
(45) Date of Patent: Mar. 26, 2019

(54) SOIL-WORKING DEVICE; METHOD FOR THE HEIGHT GUIDANCE OF AT LEAST ONE FINGER-WEEDER TOOL ABOVE A ROW IN A ROW PLANTATION

(71) Applicant: K.U.L.T. Kress Umweltschonende Landtechnik GmbH, Vaihingen/Enz (DE)

(72) Inventors: Christian Kirchhoff, Vaihingen/Enz (DE); André Duelks, Meerbusch (DE)

(73) Assignee: K.U.L.T. Kress Umweltschonende Landtechnik GmbH, Vaihingen/Enz (DE)

( * ) Notice: Subject to any disclaimer, the term of this patent is extended or adjusted under 35 U.S.C. 154(b) by 65 days.

(21) Appl. No.: 15/558,608

(22) PCT Filed: Dec. 22, 2015

(86) PCT No.: PCT/DE2015/000610
§ 371 (c)(1),
(2) Date: Sep. 15, 2017

(87) PCT Pub. No.: WO2016/146091
PCT Pub. Date: Sep. 22, 2016

(65) Prior Publication Data
US 2018/0077847 A1   Mar. 22, 2018

(30) Foreign Application Priority Data
Mar. 16, 2015   (DE) .................. 10 2015 003 441

(51) Int. Cl.
*A01B 39/08* (2006.01)
*A01B 39/18* (2006.01)

(52) U.S. Cl.
CPC .............. *A01B 39/08* (2013.01); *A01B 39/18* (2013.01)

(58) Field of Classification Search
CPC ................................ A01B 39/08; A01B 39/18
See application file for complete search history.

(56) References Cited

U.S. PATENT DOCUMENTS

| 3,082,829 A | 3/1963 | Buddingh et al. |
| 4,518,043 A | 5/1985 | Anderson |

FOREIGN PATENT DOCUMENTS

| EP | 1 116 427 A1 | 7/2001 |
| EP | 1 127 481 B1 | 8/2004 |

OTHER PUBLICATIONS

International Search Report of PCT/DE2015/000610, dated Jun. 3, 2016.

*Primary Examiner* — Tara Mayo-Pinnock
(74) *Attorney, Agent, or Firm* — Collard & Roe, P.C.

(57) ABSTRACT

A soil-working device for row plantations has a frame and at least one beam, on which at least one finger-weeder tool is arranged, which in particular can be designed to be passively drivable and which is oriented at a setting angle to the soil in a working position for soil working, and a method height-guides at least one finger-weeder tool above a row in a row plantation, wherein the soil-working device has at least one height-guiding apparatus, which keeps the setting angle of a finger-weeder tool in the working position constant and which can be designed advantageously in such a way that the height-guiding apparatus enables the height guidance of further soil-working tools which are operated next to the finger weeders and which thus can likewise be guided in height.

14 Claims, 11 Drawing Sheets

Figure 1:
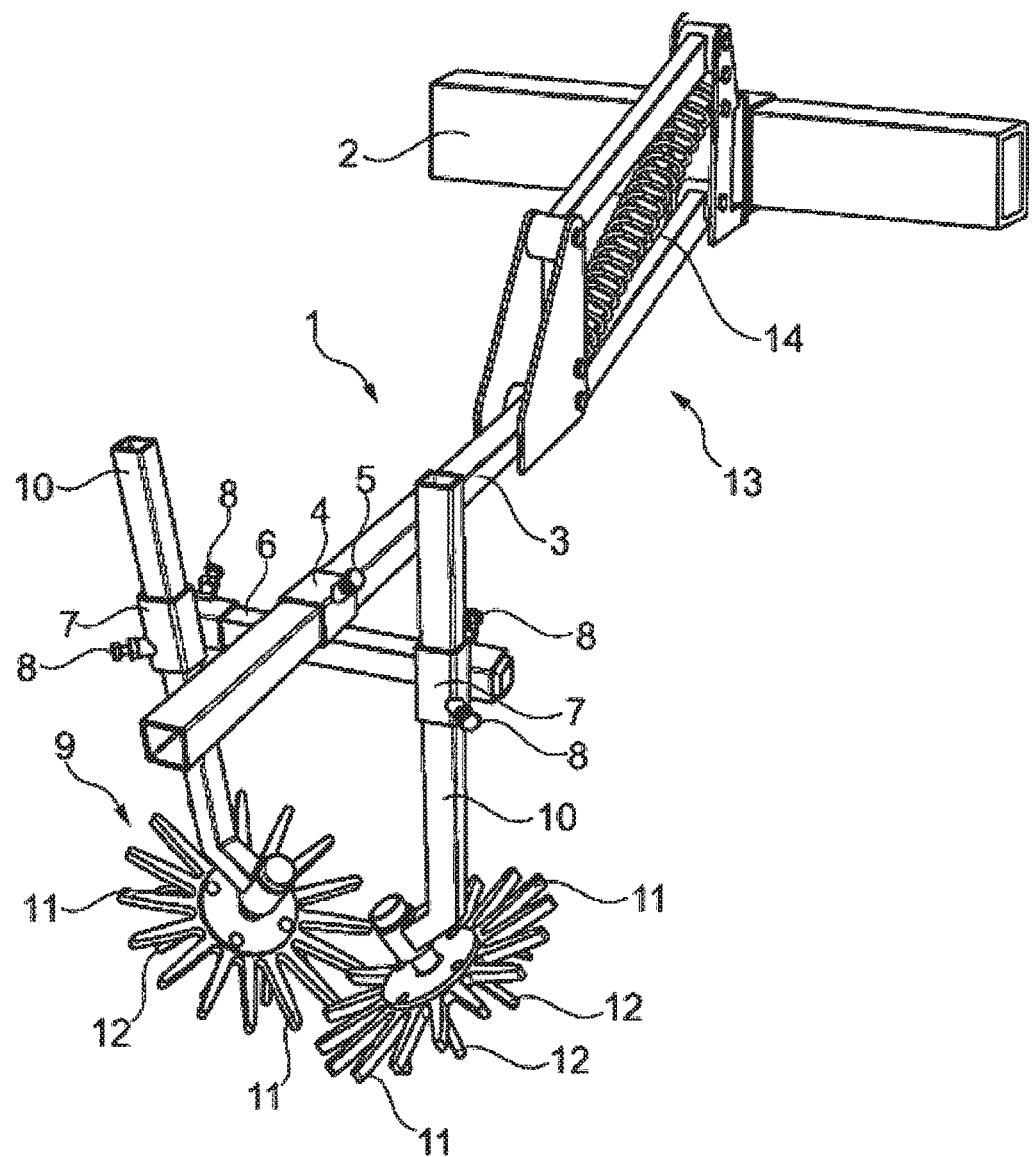

SOIL-WORKING DEVICE; METHOD FOR THE HEIGHT GUIDANCE OF AT LEAST ONE FINGER-WEEDER TOOL ABOVE A ROW IN A ROW PLANTATION

CROSS REFERENCE TO RELATED APPLICATIONS

This application is the National Stage of PCT/DE2015/000610 filed on Dec. 22, 2015, which claims priority under 35 U.S.C. § 119 of German Application No. 10 2015 003 441.3 filed on Mar. 16, 2015, the disclosures of which are incorporated by reference. The international application under PCT article 21(2) was not published in English.

STATE OF THE ART

The invention proceeds from a soil-working device for row crops, in accordance with the preamble of claim 1, and from a method for height guidance of at least one finger-weeding tool above a row in a row crop, in accordance with the preamble of claim 11.

Soil-working devices, which are used for mechanical soil working and, in particular, for weed control within one or more crop rows at the same time, have been part of the state of the art for a long time. Thus, a finger weeder for removing weeds, having a mechanical drive by means of ground drive elements, is known from the European patent EP 1 127 481 B1 and the European patent application 1 116 427 A1, which weeders are equipped with weeding fingers disposed above the ground drive elements, so as to rotate. It is true that it is possible, using this previously known finger weeder, to move working of the soil from the center of the row to the immediate vicinity of the crop plants, but adaptation of the finger-weeder tools to the ground contour proves to be difficult.

THE INVENTION AND ITS ADVANTAGES

The soil-working device for row crops, according to the invention, having the characterizing features of claim 1, and the method according to the invention, for height guidance of at least one finger-weeder tool above a row in a row crop, having the characterizing features of claim 11, in contrast have the advantage that the soil-working device, which has a frame and at least one beam, on which at least one finger-weeder tool, which is particularly configured so that it can be driven passively, is disposed, which tool is oriented at a setting angle relative to the ground in a working position for working the soil, wherein the beam of a finger-weeder tool situated in the working position is disposed above a row of the row crop or above rows of a row crop that lie closely next to one another, has at least one height-guidance unit that keeps the setting angle of a finger-weeder tool situated in the working position constant. If two finger-weeder tools are disposed on a beam, these are preferably oriented with the weeding fingers of the finger-weeder tool facing one another. By means of the setting angle of the finger-weeder tool, it is possible to influence whether soil is predominantly moved out of the row or moved into the row. It is dependent on the agricultural conditions whether moving soil into or out of the row is desired. Independent of this, however, this setting angle should be kept constant while working, even in the case of uneven heights in the field. A set setting angle is thereby maintained, so that it does not change in the working position in the case of height adjustments to the ground.

According to an advantageous embodiment of the soil-working device according to the invention, at least two finger-weeder tools are disposed on each beam for working a row of the row crop or above rows of a row crop that lie closely next to one another. Because a beam is situated above a crop row or above crop rows that lie closely next to one another (multiple rows, for example double or triple rows) when working the soil, the finger-weeder tools that are disposed on the same beam therefore experience the same height guidance, so that they are guided more precisely, on the left and the right of a crop row or on the left and the right of multiple rows or between multiple rows, for example. This arrangement makes it possible for the left side of the crop row to be worked by one finger-weeder tool disposed on the beam, and for the right side of the crop row to be worked by a second finger-weeder tool disposed on the beam, for example.

According to an additional advantageous embodiment of the soil-working device according to the invention, a height-guidance unit is adjustable and/or a height-guidance unit is disposed on the frame, on at least one beam, on at least one transverse beam, on at least one longitudinal beam, on at least one finger-weeder beam, on at least one tool beam and/or on at least one finger-weeder tool.

According to an additional advantageous embodiment of the soil-working device according to the invention, a height-guidance unit has at least one parallelogram steering mechanism, at least one telescoping unit (telescoping suspension), at least one sensor unit, at least one support wheel, which preferably runs next to the row, at least one support wheel pair, at least one depth restriction mechanism and/or at least one slide element (for example a calotte-shaped slide element). For example, a parallelogram steering mechanism or two parallel parallelogram steering mechanisms can be disposed on a beam. It is also conceivable that a support wheel is disposed on the frame or on a beam in front of or behind the finger-weeder tool. Preferably, the support wheel is adjustable in height (for example mechanically, hydraulically, pneumatically and/or electrically), particularly by means of a height-guidance apparatus.

According to an additional advantageous embodiment of the soil-working device according to the invention, the height-guidance unit has at least one load-application apparatus and/or load-relief apparatus (for example a spring, a hydraulic cylinder).

According to an advantageous embodiment, in this regard, of the soil-working device according to the invention, the load-application apparatus and/or load-relief apparatus is adjustable, particularly mechanically, hydraulically, pneumatically and/or electrically adjustable, thereby making it possible to vary the press-down pressure.

According to an additional advantageous embodiment of the soil-working device according to the invention, the height-guidance unit can be lifted out by means of an apparatus for lifting it out. In this way, the beam, together with all the subordinate modules, can be pivoted upward. This increases the ground clearance, thereby facilitating transport, for example, or allowing better handling in the headland.

According to an advantageous embodiment, in this regard, of the soil-working device according to the invention, at least one further tool (for example an angle measuring mechanism, tines, disks, duck-foot tine harrow) is disposed on the soil-working device (particularly on a beam and/or transverse beam), thereby causing the tool and the finger-weeder tool to be guided jointly.

According to an advantageous embodiment of the soil-working device according to the invention in this regard, at least one tool has a working position and a rest position. Preferably, one or more tools are brought out of the working position into the rest position by means of at least one lifting-out apparatus. Therefore a rapid switch to work with only one part of the tools is possible, and this can make sense based on agricultural needs.

According to an additional advantageous embodiment of the soil-working device according to the invention, at least one finger-weeder tool has a working position and a rest position.

Preferably, one or more finger-weeder tools are brought from the working position into the rest position by means of at least one lifting-out apparatus.

According to an advantageous embodiment of the method according to the invention for working a soil in a row crop by means of a soil-working device, which has at least one finger-weeder tool that has a setting angle relative to the ground in a working position, wherein the setting angle of the finger-weeder tool situated in the working position is kept constant while working the soil, by means of at least one height-guidance unit of the soil-working device, the setting angle of the finger-weeder tool relative to the ground is set before the soil is worked.

According to an additional advantageous embodiment of the method according to the invention, at least one parallelogram steering mechanism, at least one telescoping unit, at least one sensor unit, at least one support wheel that preferably runs next to the row, at least one pair of support wheels, at least one depth restriction mechanism and/or at least one slide element is/are used as the height-guidance unit.

According to an additional advantageous embodiment of the method according to the invention, a soil-working device according to one of claims 1 to 10 is used as the soil-working device.

Further advantages and advantageous embodiments of the invention can be derived from the following description, the drawing, and the claims.

DRAWING

Figure 2:
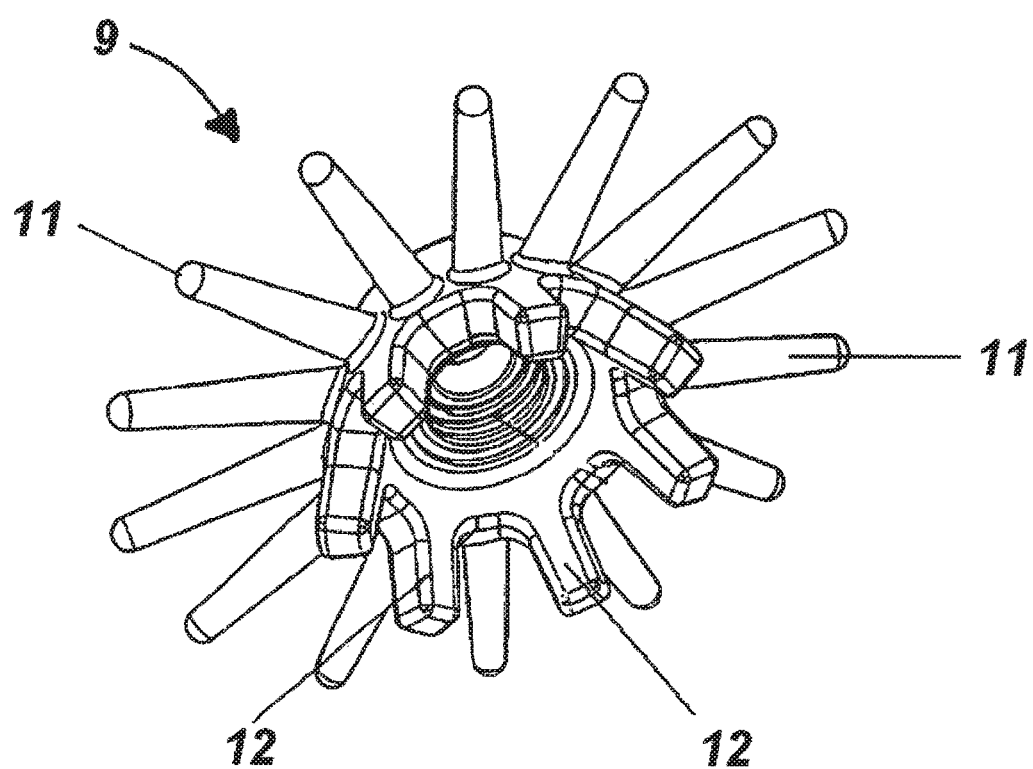
Figure 3:
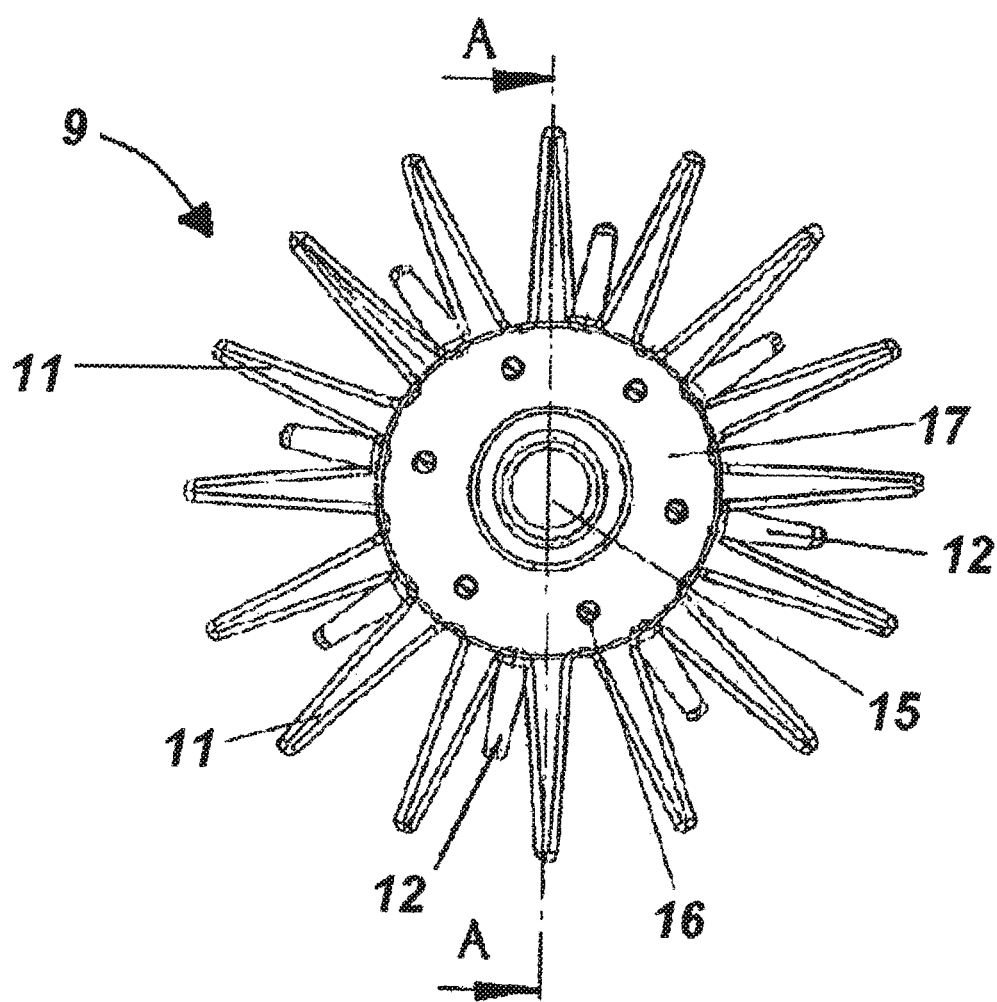
Figure 4:
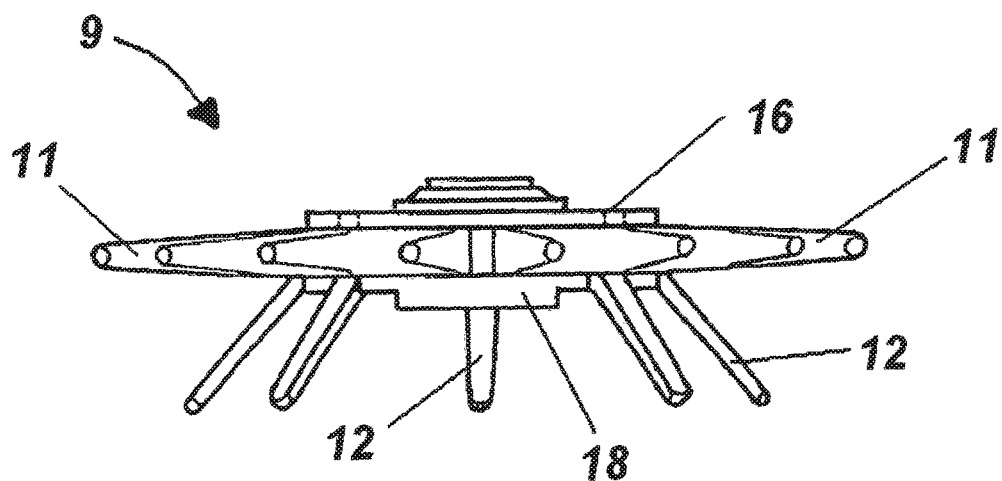
Figure 5:
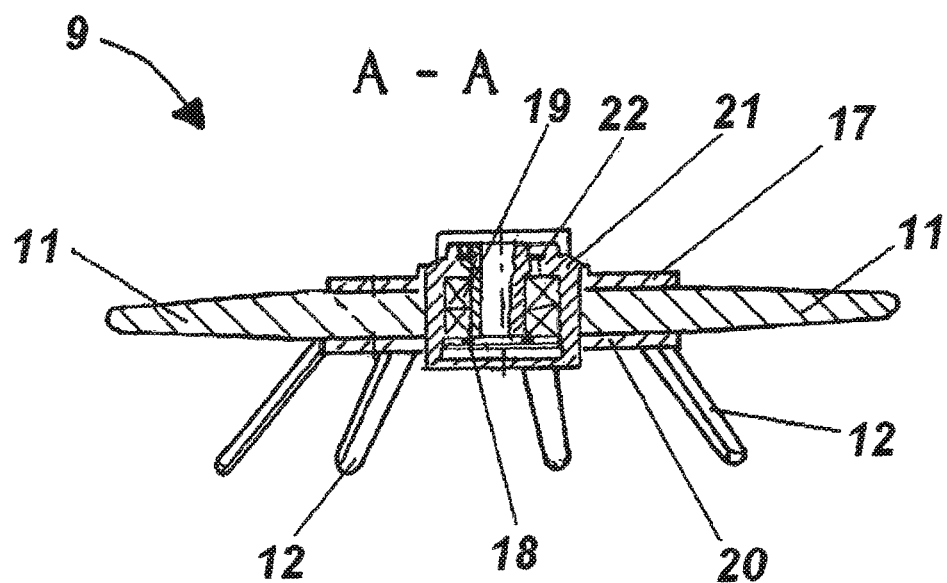
Figure 6:
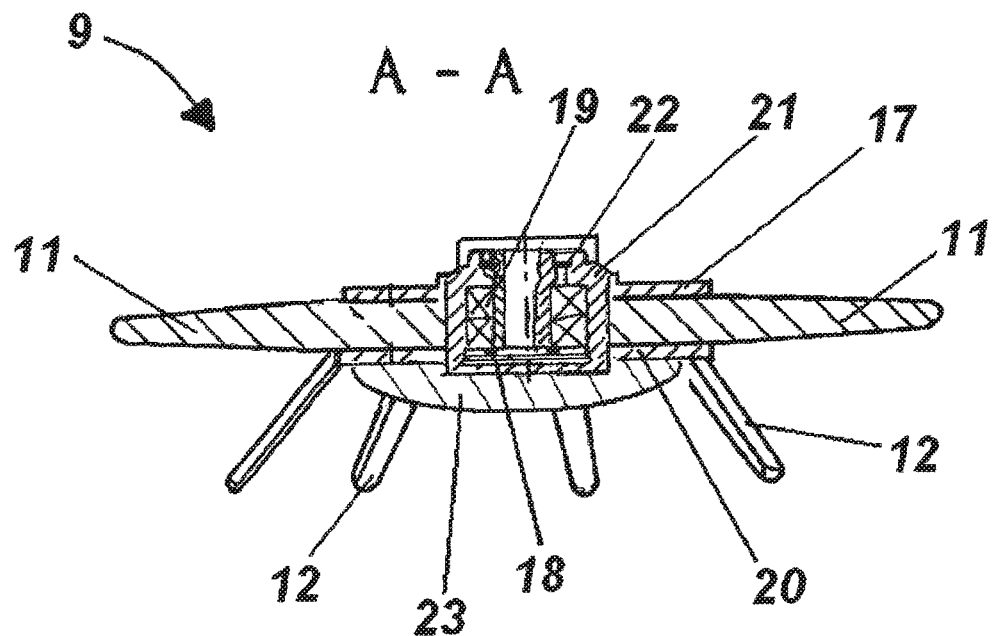
Figure 7:
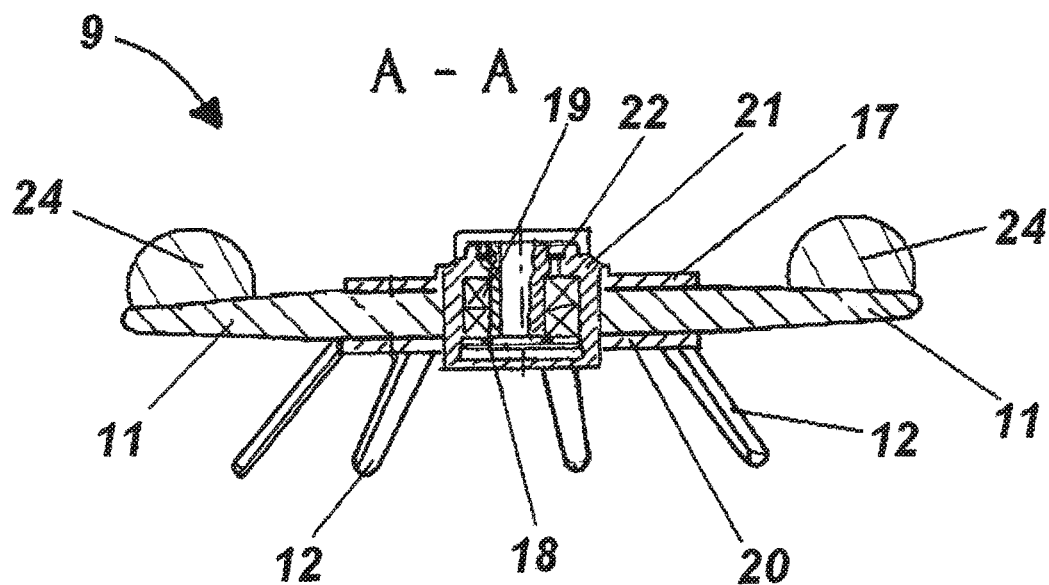
Figure 8:
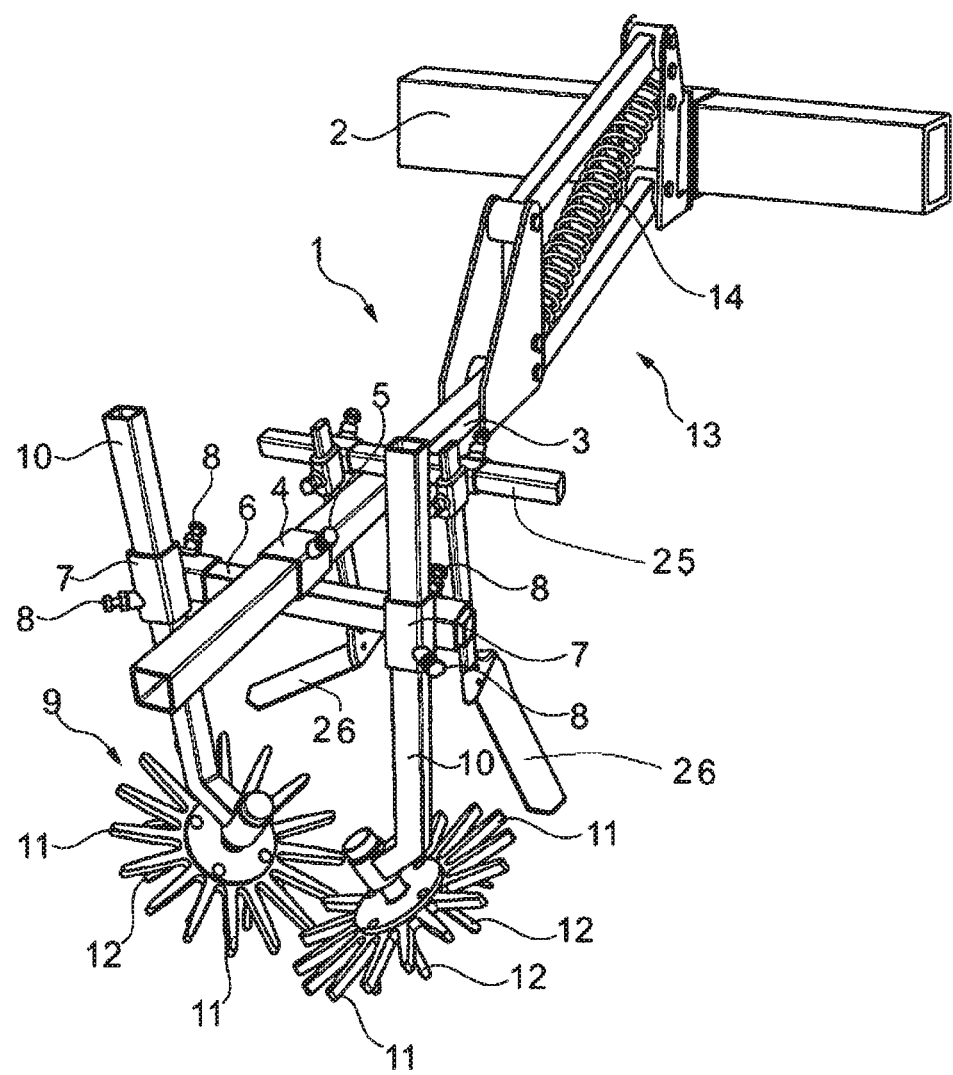
Figure 9:
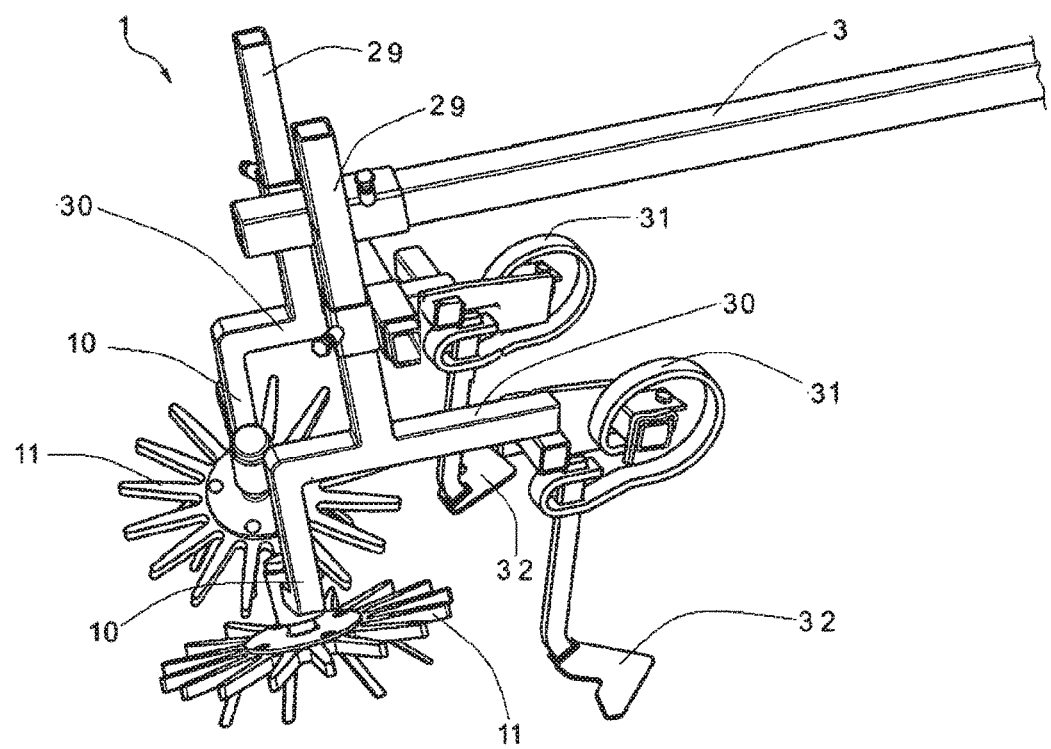
Figure 10:
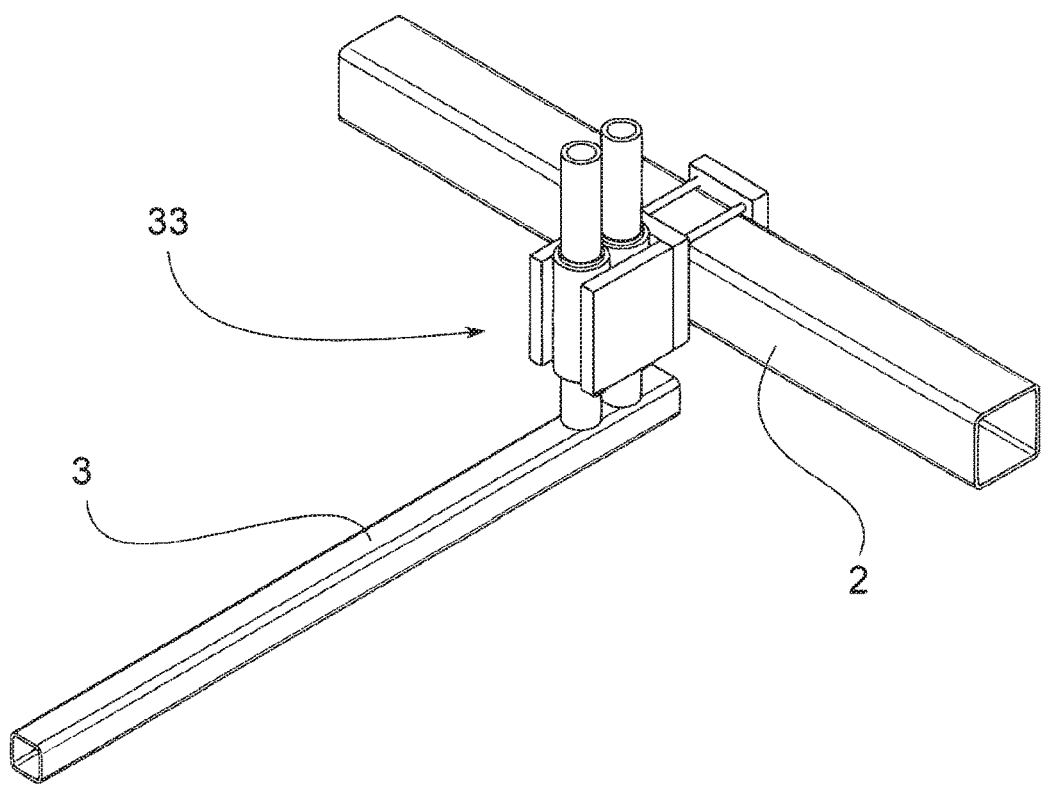
Figure 11:
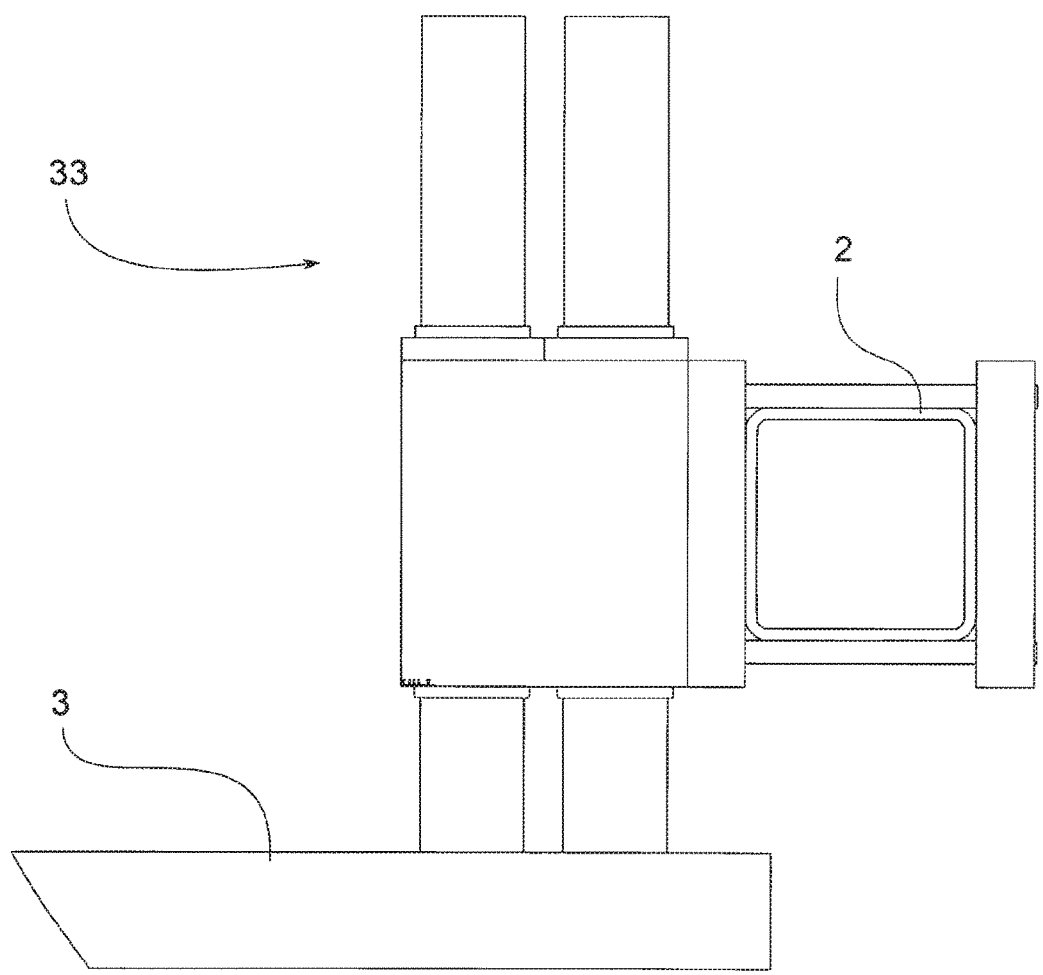
Figure 12:
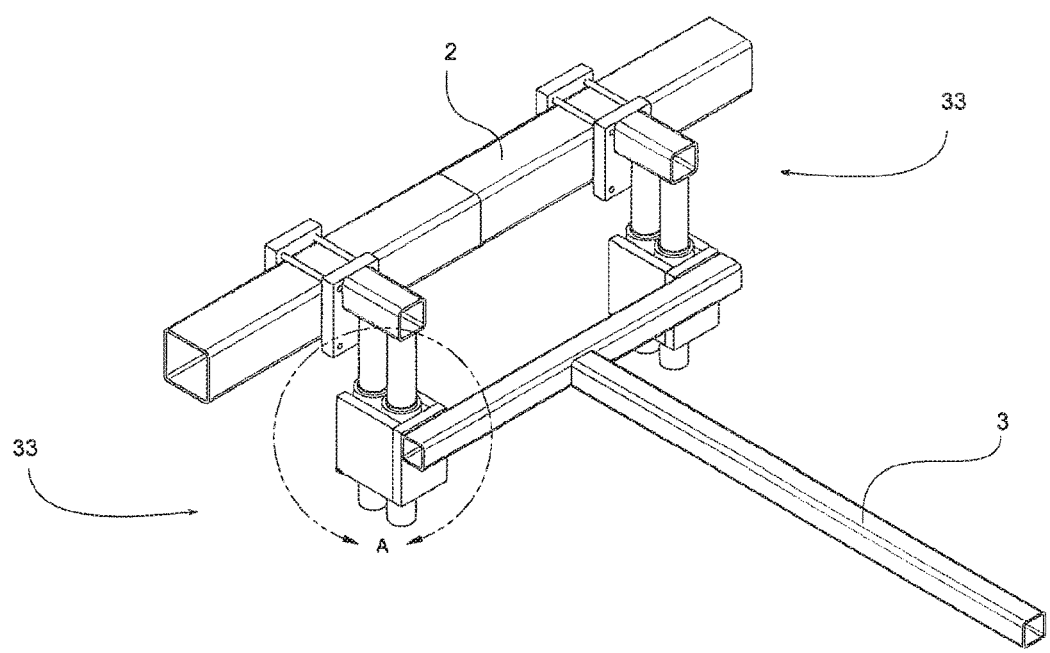
Figure 13:
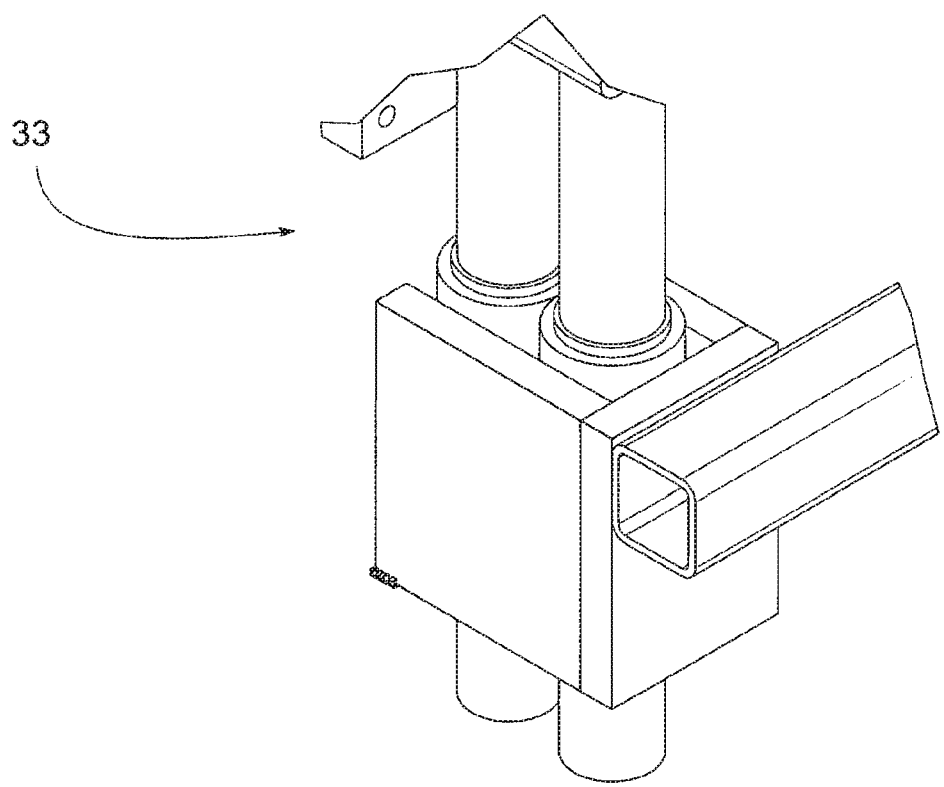

A preferred exemplary embodiment of the object according to the invention is shown in the drawing and will be explained in greater detail below. The figures show:

FIG. 1 a perspective detail view of a soil-working device according to the invention, FIG. 2 a perspective view of a possible embodiment of a finger-weeder tool, FIG. 3 a top view of a further possible embodiment of a finger-weeder tool, FIG. 4 a side view of the finger-weeder tool according to FIG. 3, FIG. 5 a sectional drawing of the finger-weeder tool according to the section line A-A from FIG. 3, FIG. 6 a sectional drawing of the finger-weeder tool according to the section line A-A from FIG. 3, in which a calotte-shaped height guidance mechanism is additionally provided, FIG. 7 a sectional drawing of the finger-weeder tool according to the section line A-A from FIG. 3, in which a scoop is provided in addition to the weeding fingers, FIG. 8 a perspective detail view of a soil-working device 1 according to the invention for row crops, FIG. 9 a detail view of a soil-working device according to the invention, FIG. 10 a perspective view of a telescoping suspension, FIG. 11 a side view of the telescoping suspension from FIG. 10, FIG. 12 a perspective view of a telescoping suspension in a different embodiment, and FIG. 13 a detail view A of the telescoping suspension from FIG. 12.

DESCRIPTION OF THE EXEMPLARY EMBODIMENT

FIG. 1 shows a perspective detail view of a soil-working device 1 for row crops, according to the invention, in which a beam 3 is disposed on a frame 2. A transverse beam 6 is disposed on the beam 3, in displaceable manner, by means of a holder 4 that has a fixation means 5. Finger-weeder tools 9 are affixed to the transverse beam 6, in displaceable manner by means of holders 7 that have fixation means 8, for working a row. A finger-weeder tool 9 particularly consists of a finger-weeder beam 10, on which the weeding fingers 11 are disposed so as to rotate. In this regard, the drive takes place mechanically, by means of ground drive elements 12 that pass over the ground. Of course, it is also conceivable that the transverse beam 6 spans multiple rows of the row crop, so that accordingly, more finger-weeder tools 9 are disposed on the transverse beam 6. In order to adapt the finger-weeder tools 9 precisely to the ground contour, the beam 3 has a parallelogram steering mechanism 13. The action of the parallelogram steering mechanism 13 can be adapted to the respective conditions when using the soil-working device 1 according to the invention, by means of a load-application apparatus and/or load-relief apparatus 14, which preferably can be adjusted hydraulically, pneumatically and/or electrically.

FIG. 2 shows a perspective view of a possible embodiment of a finger-weeder tool 9.

FIG. 3 shows a top view of a further possible embodiment of a finger-weeder tool 9 that can be disposed on the finger-weeder beam, not shown, so as to rotate about an axis of rotation 15. A cover plate 17 is connected with the weeding fingers 11 by means of screw connections 16.

FIG. 4 shows a side view of the finger-weeder tool 9 according to FIG. 3. In this regard, it becomes evident that a drive plate 18, on which the ground drive elements 12 are disposed, is connected with the weeding fingers 11.

FIG. 5 shows a sectional view of the finger-weeder tool 9 according to the sectional line A-A from FIG. 3. The finger-weeder tool 9 has a mounting composed of one or more roller bearings 19, which are encapsulated so as to be dust-tight and protected against wetness, and are positioned in the bushing 21 by means of a circlip 20. Sealing of the finger-weeder tool 9 in the direction of the suspension is provided by the shaft-sealing ring 22.

FIG. 6 shows a sectional drawing of the finger-weeder tool 9 according to the sectional one A-A from FIG. 3, in which a calotte-shaped height-guidance mechanism 23 (slide element) is additionally provided.

FIG. 7 shows a sectional drawing of the finger-weeder tool 9 according to the sectional line A-A from FIG. 3, in which a scoop 24, which serves for additional soil mixing, is disposed on the weeding fingers 11. It is also conceivable that scoops 24 are disposed on the underside of a weeding finger 11, or that scoops 24 are disposed on the underside and top side of weeding fingers 11.

FIG. 8 shows a perspective detail view of a soil-working device 1 for row crops, according to the invention, in which an additional transverse beam 25 is disposed on the beam 3.

Tools are attached to the transverse beam 25, which tools are configured as an angle measuring mechanism 26 in the present case.

FIG. 9 shows a detail view of a soil-working device 1 according to the invention, in which a longitudinal beam 30 is disposed on a tool beam 29, wherein a finger-weeder 10 proceeds from one end, and a vibro-spring 31 with a duck-foot tine harrow 32 is mounted at the other end.

FIG. 10 shows a perspective view of a telescoping suspension 33, by means of which a height shift of the beam 3 is made possible. Preferably, the telescoping suspension 33 can be displaced vertically, wherein the displaceability is implemented in that one plane is fixed, and the second plane slides over the first one (as shown in FIG. 10) or rolls over it, for example. The telescoping suspension 33 has the advantage, as compared with a parallelogram, that it is shorter, i.e. a smaller space requirement occurs in the case of mounting between the axles of the tractor, or the center of gravity is displaced toward the tractor in the case of front mounting.

FIG. 11 shows a side view of the telescoping suspension 33 from FIG. 10.

Telescoping suspensions 33 require relative little space vertically. Because the vertical space, for example, can be limited in the case of mounting between the axles of the tractor, FIG. 13 shows a perspective view of a telescoping suspension 33 in a different embodiment, which saves more space. In this regard, the telescope is mounted in such a manner that the telescoping suspension 33 faces downward from the frame 2. Because of the low passage height that remains as a result, the telescoping suspension 33 is preferably mounted next to the row in the case of such installation. In order to be able to optimally absorb the corresponding forces nevertheless, the beam 3 can be mounted between two telescoping suspensions 33, as shown in FIG. 12.

FIG. 13 shows a detail view A of the telescoping suspension 33 from FIG. 12.

In order to be better able to absorb the lever forces that occur at the beam 3, multiple telescoping suspensions 33 as explained can also be disposed next to one another or—as shown in the figures—one behind the other.

All of the characteristics presented in the description, the following claims, and the drawing can be essential to the invention both individually and in any desired combination with one another.

REFERENCE SYMBOL LIST 1 soil-working device
2 frame
3 beam
4 holder
5 fixation means
6 transverse beam
7 holder
8 fixation means
9 finger-weeder tool
10 finger-weeder beam
11 weeding finger
12 ground drive element
13 parallelogram steering mechanism
14 load-application apparatus and/or load-relief apparatus
15 axis of rotation
16 screw connection
17 cover plate
18 drive plate
19 roller bearing
20 circlip
21 bushing
22 shaft-sealing ring
23 calotte-shaped height-guidance mechanism
24 scoop
25 transverse beam
26 angle-measuring mechanism
29 tool beam
30 longitudinal beam
31 vibro-spring
32 duck-foot tine harrow
33 telescoping suspension

The invention claimed is:

1. A soil-working device (1) for row crops,
having a frame (2) and
having at least one beam (3) on which at least one finger-weeder tool (9) is disposed, wherein the finger-weeder tool (9) is disposed on the beam (3) by means of a transverse beam (6), and is oriented in a working position for working the soil, at a setting angle relative to the ground,
wherein
at least one beam (3) is disposed above a row of the row crop or above rows of a row crop that lie closely next to one another, and at least one finger-weeder tool (9) is disposed on this beam (3), by means of a transverse beam (6), for working this row of the row crop or for working rows of a row crop that lie closely next to one another, and the soil-working device (1) has at least one height-guidance unit that keeps the setting angle to the ground constant.

2. The soil-working device (1) according to claim 1, wherein
at least two finger-weeder tools (9) are disposed on each beam (3), for working a row of the row crop or rows of a row crop that lie closely next to one another.

3. The soil-working device (1) according to claim 1, wherein
a height-guidance unit is adjustable and/or a height-guidance unit is disposed on the frame (2), on at least one beam (3), on at least one transverse beam (6, 25), on at least one longitudinal beam (30), on at least one finger-weeder beam (10), on at least one tool beam (29) and/or on at least one finger-weeder tool (9).

4. The soil-working device (1) according to claim 1, wherein
a height-guidance unit has at least one parallelogram steering mechanism (13), at least one telescoping unit, at least one sensor unit, at least one support wheel, at least one support wheel pair, at least one depth restriction mechanism and/or at least one slide element.

5. The soil-working device (1) according to claim 1, wherein
the height-guidance unit has at least one load-application apparatus and/or load-relief apparatus (14).

6. The soil-working device (1) according to claim 5, wherein
the load-application apparatus and/or load-relief apparatus (14) is adjustable.

7. The soil-working device (1) according to claim 1, wherein
the height-guidance unit can be lifted out by means of an lifting-out apparatus.

8. The soil-working device (1) according to claim 1, wherein at least one further tool is disposed on the soil-working device (1).

9. The soil-working device (1) according to claim 8, wherein
at least one tool has a working position and a rest position.

10. The soil-working device (1) according to claim 1, wherein
at least one finger-weeder tool (9) has a working position and a rest position.

11. A method for height guidance of at least one finger-weeder tool above a row in a row crop or above rows of a row crop that lie closely next to one another, by means of a soil-working device (1) that has at least one beam (3) on which at least one finger-weeder tool (9) is disposed, wherein the finger-weeder tool (9) is disposed on the beam (3) by means of a transverse beam (6), and the finger-weeder tool (9) has a setting angle relative to the ground in a working position,
wherein
at least one beam (3) is passed over a row of a row crop or over rows of a row crop that lie closely next to one another, and at least one finger-weeder tool (9) disposed on this beam (3) by means of a transverse beam (6) is disposed for working a row of the row crop or for working rows of a row crop that lie closely next to one another, and the setting angle of the finger-weeder tool (9) is kept constant during working of the soil, in the working position, by means of at least one height-guidance unit of the soil-working device (1).

12. The method according to claim 11, wherein
the setting angle of the finger-weeder tool (9) relative to the ground is set before the soil is worked.

13. The method according to claim 11, wherein
at least one parallelogram steering mechanism (13), at least one telescoping unit, at least one sensor unit, at least one support wheel, at least one support wheel pair; at least one depth restriction mechanism and/or at least one slide element is/are used as a height-guidance unit.

14. The method according to claim 11, wherein
the soil-working device (1) has a frame (2) and at least one beam (3) on which at least one finger-weeder tool (9) is disposed, wherein the finger-weeder tool (9) is disposed on the beam (3) by means of a transverse beam (6), and is oriented in a working position for working the soil, at a setting angle relative to the ground, wherein at least one beam (3) is disposed above a row of the row crop or above rows of a row crop that lie closely next to one another, and at least one finger-weeder tool (9) is disposed on this beam (3), by means of a transverse beam (6), for working this row of the row crop or for working rows of a row crop that lie closely next to one another, and the soil-working device (1) has at least one height-guidance unit that keeps the setting angle to the ground constant.

* * * * *